UNITED STATES PATENT OFFICE.

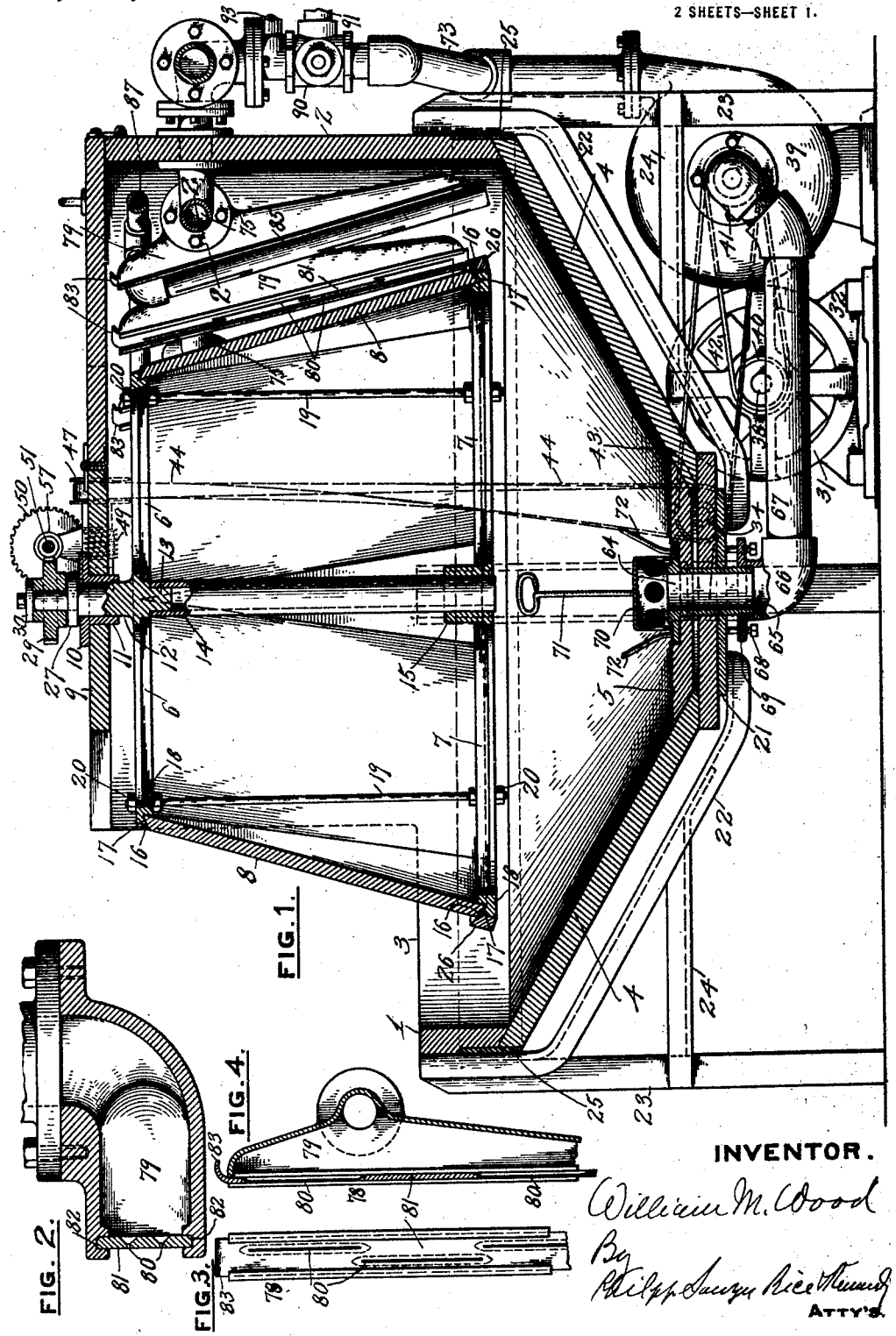

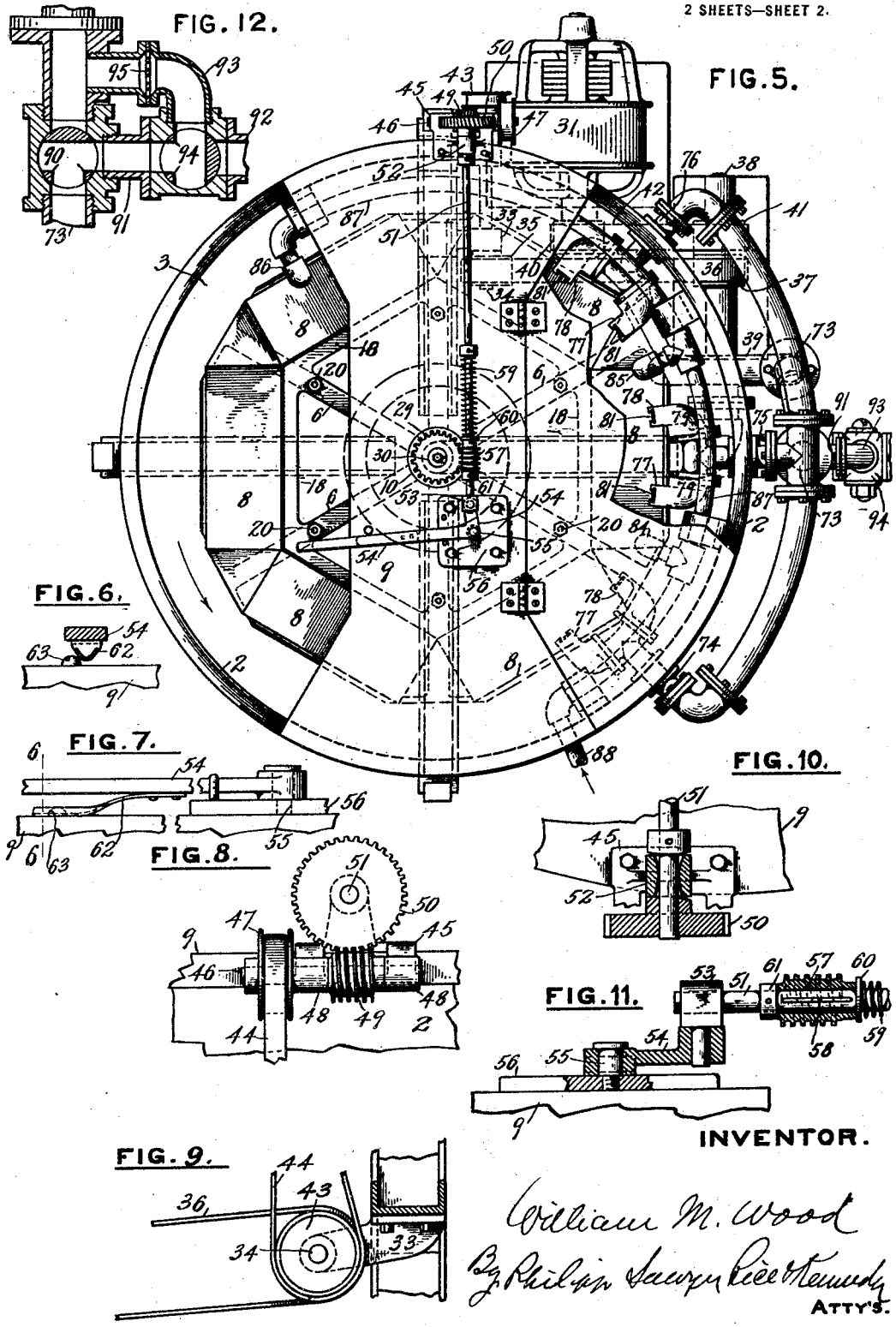

WILLIAM M. WOOD, OF NEW BRIGHTON, NEW YORK, ASSIGNOR TO R. HOE AND CO., OF NEW YORK, N. Y., A CORPORATION OF NEW YORK.

BLACKLEADING-MACHINE.

1,400,589.  Specification of Letters Patent.  Patented Dec. 20, 1921.

Application filed May 18, 1917. Serial No. 169,391.

*To all whom it may concern:*

Be it known that I, WILLIAM M. WOOD, a citizen of the United States, residing at New Brighton, county of Richmond, and State of New York, have invented certain new and useful Improvements in Blackleading-Machines, fully described and represented in the following specification and the accompanying drawings, forming a part of the same.

This invention relates to certain improvements in black leading machines for black leading the wax electrotype matrices or molds from which electrotype plates are made to render them electrolytically conductive, so that when placed in the electrotyping bath the copper or other metal will be deposited thereon to form the electrotype, and the present machine has been designed especially for wet black leading, that is, a machine in which the blackleading solution is forced into the impression surface of the wax mold or case, though as to some of its features it may be employed with other processes for applying black lead.

Various constructions have heretofore been employed for applying wet black lead solution to the cases, but these prior constructions had certain disadvantages, which were the cause of the production of imperfect shells. In these prior constructions, very often air pockets formed, due to the lead solution being improperly or unevenly applied and, furthermore, it frequently happened that the indentations in the impression surface, particularly the small or shallow ones, would be filled, or partly filled, with the black lead. Where air pockets were thus formed, the surfaces beneath them were prevented from being leaded, this condition causing holes in the electrotype shells at those points, and, where the indentations remained filled, or partly filled, with the black lead, likewise a faulty shell resulted. Furthermore, in machines as constructed prior hereto, the leaded cases are removed from the coating machine covered with a quantity of surplus black lead solution, which is removed by dipping the case in a washout bath. This had the disadvantage of weakening the black lead solution in the coating machine and caused a waste of material which was serious, as black lead material is expensive. This dipping required the operator to leave the machine and occasioned a considerable waste of time. Furthermore, in the prior constructions the case was delivered from the opposite end of the machine from where it was started, and the removal or delivery of the case occasioned a further inconvenience and loss of time.

It is one object of the invention to produce a black leading machine particularly adapted for wet black leading, by the employment of which the wax cases will be evenly and thoroughly black leaded, the formation of air pockets prevented, and the disadvantage of having indentations filled, or partially filled, with black lead, being overcome.

It is a further object of the invention to produce a wet black leading machine in which the surplus lead solution is removed from the case in the machine, the case being completely black leaded and the surplus material removed without removing the case from the machine, thus effecting a saving in time and preventing waste of the black lead solution.

It is a further object of the invention to provide a wet black leading machine of improved construction in which a continuous circulation of the black lead solution through the machine is effected, and in which there is provided a case carrier for carrying the cases through the machine, which may be operated manually when desired, or through suitable driving mechanism, and in which the case is delivered from the machine at the point where it is positioned therein.

With these and other objects not specifically referred to in view, the invention consists of certain novel parts and combinations which will be described in detail in connection with the accompanying drawings, in which—

Figure 1 is a side elevation, partly in section, of the improved black leading machine;

Fig. 2 is a sectional detail plan view of one of the leading or solution-supplying nozzles, the section being taken on line 2—2 of Fig. 1;

Fig. 3 is a front detail view of the nozzle shown in Fig. 2;

Fig. 4 is a detail sectional side view of the construction shown in Fig. 3;

Fig. 5 is a plan view of the machine shown in Fig. 1, with the top or cover partly broken away to illustrate the arrangement of the nozzles;

Fig. 6 is a detail view on the line 6—6 of Fig. 7, showing the controlling lever in section, with an automatic stop for controlling the stopping of the machine;

Fig. 7 is a detail side elevation, partly broken away, of the construction shown in Fig. 6;

Fig. 8 is a detail view on an enlarged scale of part of the driving mechanism for the carrier shown in Figs. 1 and 5;

Fig. 9 is a detail side view partly in section of certain of the belt and pulley arrangements shown in Fig. 1 for driving the carrier;

Fig. 10 is a sectional detail plan view on an enlarged scale showing the method of journaling the shaft which drives the carrier shaft, and Fig. 11 is a detail side view on an enlarged scale showing the controlling lever and connections to the carrier driving shaft.

Fig. 12 is a detail illustrating the connections for straining the solution.

Machines constructed in accordance with the invention will include means for spraying or delivering under pressure black lead solution to the impression faces of the cases and will include means for forcing the black lead solution into the indentations of the surface of the case so as to avoid the formation of air pockets and to prevent the indentations, especially the small deep ones, from remaining filled, or partially filled, with black lead solution, so that the case is evenly and perfectly coated with the solution and perfect shells produced.

Machines constructed in accordance with the invention will, furthermore, include means whereby the surplus solution may be removed from the case without removing the case from the machine, whereby the case is completely black leaded in the machine, and dipping or washing outside the machine obviated.

Constructions embodying the invention will, furthermore, include a carrier by which the cases are carried past the black lead solution-supplying means, and means for evenly distributing the solution over the cases, and in constructions embodying the invention in its best form this carrier will be a rotary carrier which carries the case from the point where the cases are positioned on the carrier through the machine and back to the positioning point, whereby the operator does not have to leave his position at the starting point of the machine, but removes and inserts the cases from the one position, thereby effecting a considerable saving in time.

The particular constructions for effecting these various results may, of course, be widely varied, but in the drawings has been shown a preferred embodiment of the invention, and one which has been satisfactory in actual practice.

Referring now to these drawings, the black lead solution is carried in a container in the form of a tank 1 of suitable dimensions.

In machines embodying the invention in its best form, where the carrier is a rotary carrier, this tank 1 is a circular tank of wood or any other suitable material, having vertical sides 2, the sides at the front of the machine being cut away, as indicated at 3 (Figs. 1 and 5), to provide access to the carrier for positioning and removing the cases. Below the vertical walls 2, the tank is preferably formed with sloping walls 4, gradually sloping to a bottom piece 5, the slope being such as to form in effect a cone-shape, this shape of tank, when the solution is withdrawn therefrom, causing a swirling motion of the fluid and preventing undue settlement of the black lead in the bottom of the tank, with consequent unevenness in the solution.

Located in this tank, to operate above the solution, is a traveling carrier by which the cases or molds are presented to the solution-supplying and evening mechanisms. While this carrier may be of any suitable type, in machines embodying the invention in its best form this carrier will be a rotary carrier, that is, a carrier rotating around a fixed axis, so that the cases or molds may be inserted at one point in the machine, carried past the various mechanisms by which the case is properly leaded, and back to the point of insertion, where they may be removed by the operator without his having to change his position, the case during its movement with the carrier being leaded and finished. While the specific construction of this carrier and the method of mounting it in the tank may be somewhat varied, preferably and as shown this carrier is mounted to rotate above the sloping walls of the tank so as to be above the solution, and about a fixed vertical axis. In the particular construction illustrated, the carrier is in the form of a hexagon having upper and lower frames 6, 7 between which are mounted six panels or case supports 8. In the best constructions, and as shown, the lower supporting frame 7 is of greater horizontal dimension than the upper supporting frame 6, so that the panels, when mounted between the frames, lie at an oblique angle, or slantingly toward the axis of the carrier. This carrier may be supported in any suitable manner. In the particular construction illustrated, the tank is provided with a cover-plate 9 which is apertured centrally to receive a bearing plate 10 having a depending flanged portion 11 extending through the cover. In this flanged portion rotates a hub 12 which may, if desired, be formed integral with the top frame 6 of the carrier. This hub has a portion 13 extending through the frame 6 to which is secured one end of a vertical shaft 14, the other end of the shaft being secured in a bearing sleeve 15 fast to and movable vertically along the shaft with the bottom carrier frame 7 before referred to. Means hereinafter referred to are provided for driving the shaft 14 and, through it, the carrier frames. The shaft 14, furthermore, acts as a guide and a steadying device or brace for the lower carrier frame 7.

The case supports or panels 8 may be secured in any suitable manner between the carrier frames 6, 7. In the particular construction illustrated, all of these panels except one are secured as shown in Fig. 1 by providing them with beveled upper and lower edges 16, which take into grooves 17 formed in the edges 18 of the upper and lower carrier frames before referred to, the panels or supports being clamped in position between the frames by means of rods 19 and nuts 20, the bottom frame 7 and sleeve 15 sliding on the shaft 14 when the nuts are turned to clamp the panels or supports. One of the panels or supports may be made removable in any suitable manner (not illustrated) to permit access to the interior of the carrier, if this be desired for any purpose.

The tank is supported in any suitable manner, as by the provision of a supporting plate 21 on which the bottom of the tank rests, the plate 21 being carried on braces 22 secured to side frames or legs 23, which rest on the floor or other suitable support. Additional strengthening braces 24 may be provided, if desired, between the braces 22 and the legs 23, to provide additional stiffness and rigidity to these supporting members. To prevent the sides and bottom of the tank from spreading, a band of steel or other rigid material 25 may be provided, encircling the sides of the tank, as shown in Fig. 1.

With the carrier constructed as described, the cases are placed against the mold supports 8 through the cut-away portion 3 of the sides of the tank, and are supported by a beveled supporting flange or bar 26 provided at each of the sides of the lower carrier frame 7, as shown in Fig. 1, the cases or molds resting with their impression side out slantingly or obliquely against the supporting panels.

The cases having been placed in position, the carrier is rotated to carry the mold case past the various agencies to which it is subjected. While various means may be employed for rotating the carrier, preferably these means will be such that the carrier may be given a quick movement by hand to bring it into proper position for the insertion of a case and then a slow mechanical movement which will move the carrier at a predetermined speed past the black-leading and evening devices, so that the cases will be properly leaded. The means for effecting the rotation of the carrier may be widely varied. In the particular construction illustrated, there is provided about the hub 12, above the bearing plate 10 and seating thereon, a thrust washer 27 against which runs a driving gear 29 fast on the end of the hub 12, this gear being held in position against the thrust bearing by cap piece 30, the rotation of the shaft 14 being effected through the rotation of the gear 29.

The prime mover for effecting rotation of the carrier shaft may be of any suitable character, but preferably will be, as shown, an electric motor 31 suitably mounted on a frame 32 on the floor or other convenient support. The driving connections from the motor 31 to the driving gear 29 may vary somewhat in construction. These connections will, however, be such that they can be thrown out of operation so that the carrier can be quickly rotated by hand when desired and then thrown into operation to provide a mechanical movement at required speed. In the particular construction illustrated, there is secured to one of the stiffening braces 24, before referred to, on the motor side of the machine, a pair of brackets 33, one of which is shown (see Fig. 9), which support at their outer ends a short shaft 34. This short shaft 34 has secured to its inner end a pulley 35 (see dotted lines Fig. 5) which is driven by a belt 36 (see Fig. 9) from a pulley 37 on the shaft 38 of a suction pump 39, the purpose of which is hereinafter referred to, this suction pump being driven from the motor 31 by means of pulleys 40, 41 on the motor and pump shaft, respectively, and belt 42 (see Fig. 1).

On the other end of the short shaft 34 is secured a pulley 43 over which passes a belt 44 driven from the pulley. Secured to the cover 9 of the tank before referred to is a bracket 45 (see Figs. 5 and 8) in which is mounted a short worm shaft 46 to one end of which is secured a pulley 47, over which passes by a quarter twist the belt 44 from the pulley 43 before referred to. This short worm shaft 46 is provided centrally between bearings 48 carried by the brackets 45 before referred to, with a worm 49 which meshes with a worm gear 50 on one end of a cross driving shaft 51 extending across the cover of the machine, as shown in Fig. 5.

For a purpose hereinafter referred to, one end of the cross shaft 51 is carried in a barrel bearing 52 (see Fig. 10) rising from the brackets 45, this barrel bearing permitting a rocking movement of the shaft in the bearing. The other end of the shaft (see Fig. 11) is carried in a pivot or swivel bearing 53 mounted on an operating or controller lever arm 54, this lever being fulcrumed on a stud 55 fast in a supporting plate 56 secured to the top cover 9 of the machine. Secured on the end of the cross shaft 51, next to the lever arm 54, is a worm 57 which, by the movement of the operating lever, may be brought into engagement with the driving gear 29 on the carrier hub 12 before referred to. The provision of the barrel bearing 52 and a slight clearance between the threads of worm gear 49 and the teeth of worm gear 50, permit the worm 57 to be swung into and out of mesh with the worm gear 29 on the carrier shaft by swinging the controller lever 54 on its fulcrum. With this construction, the slow mechanical movement for rotating the carrier while the case is being leaded may be thrown out of action and, when the worm 57 is out of mesh, the carrier may be freely revolved by hand, when desired, as, for instance, when the first mold is placed on the carrier, or if a single mold should be wanted quickly the carrier may be quickly swung around to bring the case into position to be leaded before throwing in the slow worm feed.

Machines embodying the invention in its best form will include means whereby the effect of any sudden strain or shock, due to the driving worm 57 being suddenly thrown into mesh with the driving gear 29 while the carrier is rapidly revolving, may be compensated for. While the particular means employed for effecting this may be varied, in the particular construction illustrated the driving worm 57 is secured to the cross shaft 51 so that it may have a sliding movement thereon, this being effected by securing the worm on the shaft by a key or feather 58, the worm being held in driving position by a spring 59 pressing against a sliding collar 60 which holds the worm against a stop collar 61 fast on the driving shaft 51 before referred to. With this construction, if the worm 57 should be thrown into mesh while the carrier is rapidly revolving, the teeth of the driving worm gear 29 will cause the worm 57 to slide along the shaft against the action of spring 59, compressing the same, this construction obviating any damage to the machine due to an undue momentum of the heavy case carrier.

In constructions embodying the invention in its best form, an automatic safety throw-out device will be provided for stopping the machine in the event of a molded case being improperly placed on the carrier or in the event that such mold or case should topple over against the side of the tank and bind against the tank or any of the mechanisms located therein, and more specifically hereinafter referred to, or for any cause there should be too much resistance on the rotation of the carrier, which would be liable to damage or injure the operating parts of the machine. While the particular construction for effecting this may be varied, as illustrated (referring to Figs. 6 and 7), the controlling lever 54 is provided on its under side with a spring 62, which is arranged to be in frictional contact with the top or cover 9 of the tank. Fast on the top or cover is a stop or knob 63 so located that when the driving worm 57 is thrown into mesh with driving gear 29, the spring 62 will snap over the knob 63, illustrated in Fig. 6, and hold the operating lever 54 in operating position until there is an excessive thrust on the driving worm 57. When this occurs, the excessive thrust tends to force the driving worm away from the driving gear, and this thrust will snap the spring 62 over the knob 63 and permit the gears to become unmeshed, so that the driving mechanism is thrown out of operative relation and no damage to the machine results.

Machines constructed in accordance with the invention will include suitable mechanism, the specific construction of which may be varied, for applying the black lead solution to the impression surface of the mold or case. Such machines will also include means for evening the solution applied, so that the formation of air bubbles in the indentations in the impression surface of the case will be prevented and the case be evenly coated without the indentations remaining filled or partially filled with black lead, with the result that an evenly coated, perfect shell is produced. While these means may vary somewhat in character, in machines embodying the invention in its preferred form a black lead solution will be applied to the case under pressure and, after the black lead solution has been thus applied, means will be provided for evening the applied solution, that is, forcing the solution evenly into the indentations of the case or removing surplus solution from such indentations, if too much solution has accumulated therein, and, preferably, in the best constructions, there will be a plurality of such means, successively operated, so as to insure the thorough and perfect leading of the mold or case. While the specific embodiment of these means may vary widely in construction, where the carrier is a rotary carrier the leading and evening means will be positioned around a portion of the periphery of the carrier, a sufficient number of the leading and evening devices being employed to effect the desired result. In the construction shown, the black lead solution is supplied from the tank 1 before referred to, being drawn off from the apex of the coned bottom of the tank by means of the suction pump 39 before referred to. In the construction shown, there is provided a tubular flanged suction connection 64 (see Fig. 1) seating in a recess in the bottom plate 5 before referred to. This suction connection has a depending threaded portion 65, to which is secured the threaded flanged elbow 66 connecting with suction pipe 67 leading to the intake side of the pump 39. A tight connection between the flange of the suction section 64 and the bottom 5 of the tank is effected by means of screw bolts 68 taking through the flange 69 of the flanged elbow 66 and against the supporting plate 21 of the tank 1 before referred to. In the best constructions, a strainer 70 is provided over the inlet end of the suction connection 64, which may be removed when desired by means of a handle 71, suitable guides, as 72, being provided to insure the strainer being correctly placed when returned to place over the suction inlet.

The suction pump 39 forces the black lead solution into a main delivery pipe 73, from which the solution is distributed to branch delivery pipes. The number of these branch pipes may, of course, be varied as desired, depending on the amount of lead solution it is desired to deliver to the case. In the construction illustrated, there are three of these pipes, 74, 75 and 76, arranged around the periphery of the tank. From these branch delivery pipes the black lead solution is delivered against the face of the mold or case as it revolves past on the carrier, through suitable delivery nozzles which are provided for each of the delivery pipes. The construction of each of these nozzles is similar, and a description of one will be sufficient. Referring to Figs. 2 to 5, inclusive, each branch delivery pipe delivers to a set or pair of nozzle pipes 77, 78, each of which has a discharge nozzle chamber 79 which extends vertically substantially the height of the case supporting panels or supports 8 before referred to, as clearly shown in Fig. 1. In the best constructions, furthermore, these nozzles are set obliquely corresponding to the inclination of the case supports. From the nozzle chambers 79, the solution is delivered against the face of the mold or case through nozzles. While the particular construction of these nozzles may be widely varied, in the best constructions these nozzles will be openings or orifices 80 which are, as shown in Fig. 3, formed in a nozzle plate 81, and are arranged preferably in staggered relation to each other to effect an even and continuous supply of the solution against the face of the mold or case from the top to the bottom thereof. In the best constructions, so that the nozzles may be readily cleaned if they become clogged up, the nozzle plates are supported so as to be removable. As illustrated, the nozzle plates are mounted to slide in grooves 82 formed in the face of the nozzle chamber 79 and the plates are formed with a hooked end 83 by which they may be readily withdrawn from the guides and cleaned or renewed.

In machines constructed in accordance with the invention, after a coat of black lead has been applied to the case, means will be provided for forcing the solution into the indentations of the case to prevent air bubbles being formed therein or removing surplus solution from the indentations, and, in machines where a plurality of coats of solution are applied to the case, these evening means will be preferably brought into operation after each application, so that after the case has been blackleaded, the black lead will be evenly distributed over the surface thereof. While various means may be employed for effecting this result, a simple and efficient agency is that illustrated in the drawings, in which, after each application of the black lead to the case, a current of air under pressure is driven against the face of the case for effecting the evening of the applied solution. In accordance with the invention, therefore, air nozzles 84, 85, and 86 will be provided, through which air under pressure is blown from a supply pipe 87 common to all the nozzles supplied with air through a pipe 88 from any suitable source (not shown) with air under pressure. These air nozzles will, in the best constructions, extend vertically the length of the case so as to cause the air to be brought against the entire impression surface of the case.

The air nozzles 84, 85 cause the black lead solution to be evenly distributed over the impression face of the mold or case, the lead being driven to the bottom of the indentations therein and effectually preventing the formation of air bubbles or undue filling of the small indentations in the face of the case. In machines embodying the invention in its best form, the third air nozzle 86 is provided to remove the surplus solution from the face of the mold, this surplus solution being returned by gravity to the tank, this construction preventing a weakening and consequent waste of the solution in the tank and rendering unnecessary subsequent dipping or washing of the case.

In machines constructed in accordance with the invention, connections will preferably be provided whereby the blackleading solution may be removed from the tank so that the machine can be cleaned out and so that this solution, after being used for a time, may be removed and filtered and also so that when new solution is made it may be thoroughly mixed before it is used for leading the case. In the particular construction illustrated, the main upright delivery pipe 73 (Fig. 1) is provided with a valve 90 having a side outlet pipe 91. In the normal running of the machine, this valve is set so that the solution is circulated from the tank through the branch delivery pipes 74, 75 and 76 and through the nozzle openings 80, as described. By suitably operating the valve, the delivery to the branch pipes is closed and the solution is taken from the tank and sent through the side outlet 91 through a suitable connection 92 to a container (not illustrated), thus emptying the tank. If it be desired to clean the solution, which may become filled with various foreign substances, such as small pieces of wax washed from the cases, the solution may be pumped from the tank through the outlet 91 to the connecting pipe 92 before referred to and returned from this pipe back to the tank through a connection 93 leading to the delivery pipe on the other side of the valve 90, so that the solution will be delivered back to the tank of the machine. This circulation is effected by the provision of a valve 94 in the connection 92 which may be operated to cause the solution to pass through the connection 93. The solution as it passes back to the tank is filtered through a strainer located in any suitable position in the connections, such as a strainer 95 in the branch connection 93 before referred to. To mix new solution, the valve should be set to effect a circulation through the tank, the solution being circulated until it is mixed sufficiently for its application to the cases.

With the machine as described, the molds or cases are perfectly leaded and shells produced free from the defects caused by air bubbles or too much lead solution in the small indentations, and a machine is furthermore produced in which the case is carried through the machine, leaded, the surplus solution removed, and the case brought back to the starting point so that the operator may stand in one position in front of the machine, and a considerable saving in time in leading the cases is effected. While the construction shown and described has been found very effective for the purposes intended, it is understood that various changes and variations may be made in the form of carrier, the mechanism for driving it, and the particular construction of the double-spraying and air-supplying nozzles, without departing from the invention, and it will be understood that such changes and variations may be made.

What is claimed is:

1. In a black leading machine, the combination of a continuously rotating case carrier, means for supporting a case thereon, means for supplying black lead solution to the face of the case, means for evening the solution after it has been applied to the face of the case, and means for driving the carrier past the solution-supplying and evening means.

2. In a black leading machine, the combination with a black lead solution container, of a continuously rotating case carrier mounted to travel therein above the solution, means for positioning and supporting a case on the carrier, means for supplying black lead solution to the face of the case, and means for causing the carrier to travel with the case thereon from the point where the case is positioned on the carrier past the solution-supplying means and back to the point of positioning the case.

3. In a black leading machine, the combination with a black lead solution container, of a continuously rotating case carrier mounted to travel therein above the solution, means for positioning and supporting a case on the carrier, means for supplying black lead solution to the face of the case, means for evening the solution after it has been applied to the face of the case, and means for causing the carrier to travel with the case thereon from the point where the case is positioned past the solution-supplying and evening means and back to the point where the case is positioned in the carrier.

4. In a black leading machine, the combination with a case carrier, of means for supporting a case thereon, a plurality of independent means for supplying black lead solution to the face of the case, means for evening the solution after it has been applied to the face of the case, and means for driving the carrier past the solution-supplying and evening means.

5. In a black leading machine, the combination with a case carrier, of means for supporting a case thereon, means for supplying black lead solution to the face of the case, means for evening the solution after it has been applied to the face of the case and for removing surplus solution from the case face, and means for driving the carrier past the solution-supplying, and evening and solution-removing means.

6. In a black leading machine, the combination with a black lead solution container, of a case carrier mounted to travel therein above the solution, means for positioning and supporting a case on the carrier, means for supplying black lead solution to the face of the case, means for evening the solution after it has been applied to the face of the case and for removing surplus solution from the carrier face, and means for causing the carrier to travel with the case thereon from the point where the case is positioned on the carrier past the solution-supplying, and evening and solution-removing means back to the point where the case is positioned on the carrier.

7. In a black leading machine, the combination with a case carrier, of means for supporting a case thereon, means for successively supplying black lead solution and air under pressure to the face of the case for evening the solution after it has been applied, and means for driving the carrier past the solution-supplying and air-supplying means.

8. In a black leading machine, the combination with a black lead solution container, a rotary case carrier supported to rotate above the solution, means for supporting a case on the carrier, means for supplying black lead solution to the face of the case, means for supplying air under pressure to the face of the case after the black lead solution has been applied, and means for rotating the carrier past the solution-supplying and air-supplying means.

9. In a black leading machine, the combination of a black lead solution container, a rotary case carrier supported to rotate above the solution, means for supporting a case on the carrier, a plurality of nozzles for successively supplying black lead solution to the face of the case, nozzles arranged between the solution-supplying nozzles for supplying air under pressure to the face of the case after the black lead solution has been applied, and means for rotating the carrier past the nozzles.

10. In a black leading machine, the combination with a black lead solution container, a rotary case carrier, means for supporting the carrier above the surface of the solution, means for supporting a case on the carrier, means for rotating the carrier, means for supplying black lead solution to the face of the case at a plurality of points in the rotation of the carrier, and means for supplying air under pressure after the final application of the black lead solution to remove surplus solution from the case.

11. In a black leading machine, the combination with a black lead solution container, a rotary case carrier, means for supporting the carrier above the surface of the solution, means for supporting a case on the carrier, means for rotating the carrier, means for supplying black lead solution to the face of the case at a plurality of points in the rotation of the carrier, and means for supplying air under pressure to the face of the case after each application of the black lead solution to even the coating and to remove surplus solution from the case.

12. In a black leading machine, the combination of a continuously rotating case carrier, means for supporting a case thereon, means for supplying black lead to the face of the case, and means for evening the black lead supplied while the case is on the carrier.

13. In a black leading machine, the combination of a rotary case carrier, means for holding a case thereon, means for supplying black lead solution to the face of the case, and means for continuously rotating the carrier past the solution-supplying means.

14. In a black leading machine, the combination of a black lead solution container, a case carrier supported above the solution, means for supporting a case on the carrier, a plurality of nozzles for supplying black lead solution to the face of the case, nozzles arranged between the solution-supplying nozzles for supplying air under pressure to the face of the case after the black lead solution has been applied, and means for moving the carrier past the nozzles.

15. In a black leading machine, the combination of a black lead solution container, a case carrier supported above the solution, means for giving the carrier a traveling movement, means for supporting a case on the carrier, means for supplying black lead solution to the face of the case at a plurality of points in the travel of the carrier, and means for supplying air under pressure after the final application of the black lead solution to remove surplus solution from the case.

16. In a black leading machine, the combination with a case carrier, of means for supporting a case thereon, means for supplying black lead solution to the face of the case, means for evening the lead solution, and means for removing surplus solution from the face of the case while it is on the carrier.

17. In a black leading machine, the combination with a rotary case carrier, means for supporting a case thereon, means for supplying black lead solution to the face of the case, means for blowing air under pressure against the face of the case for evening the solution after it has been applied and for removing surplus solution from the face of the case while it is on the carrier, and means for rotating the carrier.

18. In a black leading machine, the combination with a black lead solution container, of a case carrier mounted to rotate above the solution therein and formed with slanting sides for supporting a case, a plurality of sets of slanting nozzles for applying black lead solution to the face of the case as the carrier rotates, nozzles for supplying air under pressure located between the solution-supplying nozzles, and means for rotating the carrier.

19. In a black leading machine, the combination with a tank for holding black lead solution, of a case carrier having paneled sides forming case supports mounted to rotate in the container above the solution, solution applying means, a vertical shaft for driving the carrier, a second shaft, connections between the shafts for rotating the vertical shaft, and means whereby the connections may be thrown out of operative relation to permit the carrier to be rotated independently of its driving means.

20. In a black leading machine, the combination with a tank or container for holding black lead solution, of a case carrier having case supporting means mounted to rotate in the container above the solution, solution applying means, a vertical shaft for driving the carrier, a second shaft, connections between the shafts for rotating the vertical shaft, a controller for throwing the connections out of operative relation, and means whereby an excessive strain on the carrier shaft will actuate the controller.

21. In a black leading machine, the combination with a tank or container for holding black lead solution, of a case carrier having case supporting means mounted to rotate in the container above the solution, solution applying means, a vertical shaft for driving the carrier, a gear thereon, a second shaft, a gear thereon meshing with the gear on the first shaft, a bearing on the second shaft permitting a rocking of the shaft therein whereby the gears may be thrown out of operative relation, a controller, and means whereby an excessive thrust on the vertical shaft will actuate the controller to throw the gears out of operative relation.

22. In a black leading machine, the combination with a tank or container for holding black lead solution, of a case carrier having case supports thereon mounted to rotate in the container above the solution, solution applying means, a vertical shaft for driving the carrier having a gear thereon, a second shaft having a gear meshing with the gear on the vertical shaft, said gear on the second shaft being mounted to have a sliding movement thereon, and a spring for holding the gear in operative position.

23. In a black leading machine, a case carrier comprising upper and lower frames of different dimensions, sloping case supports clamped between the frames, solution applying means, a vertical shaft from which the frames are supported, and means for driving the shaft.

24. In a black leading machine, the combination of a case carrier, solution applying means, a shaft on which the carrier is supported, a driving shaft, a controller for effecting driving connection between the shafts, and a stop for holding the controller in operative position.

25. In a black leading machine, the combination of a case carrier, solution applying means, a shaft on which the carrier is supported, a driving shaft, a controller for effecting driving connection between the shafts, and spring means for holding the controller in operative position.

26. In a black leading machine the combination of a solution container, a case carrier and means for driving it, a solution distributing nozzle adjacent to the carrier having elongated distributing orifices arranged in staggered relation with each other vertically of the nozzle, and connections between the nozzle and the container.

27. In a black leading machine the combination of a solution container, a case carrier and means for driving it, a distributing nozzle arranged adjacent the carrier having a nozzle chamber and a removable nozzle plate provided with distributing orifices arranged vertically of the plate, and connections between the container and the nozzle chamber.

28. In a black leading machine, the combination of a solution container, a case carrier and means for driving it, a solution distributing device arranged adjacent the case carrier including a pair of nozzle chambers each of which is provided with vertically arranged nozzle plates having distributing orifices arranged vertically of the plate, and a common connection between the nozzle chambers and the solution container.

29. In a black leading machine, the combination of a solution container, a case carrier and means for driving it, a solution distributing and supply device located adjacent the case carrier, the said device including solution supply nozzles arranged in sets, each set including a pair of nozzle chambers each provided with a plate having discharge orifices arranged vertically thereof, and connections between the distributing and supply device and the solution container.

30. In a black leading machine, a solution container, a case carrier and means for driving it, a black lead distributing and evening device located adjacent the case carrier including solution-supplying nozzles arranged in sets, each set including a pair of nozzle chambers having a plate formed with discharge orifices, and air-supplying nozzles between the sets of solution-distributing nozzles, and connections between the distributing and evening device and the solution container.

31. In a blackleading machine, the combination with a tank or container for holding blacklead solution, of a carrier in the tank above the solution, means for applying black lead solution to a case supported on the carrier, means for withdrawing solution from the tank, a main delivery pipe, a valve in the pipe, and connections from the valve by which solution may be returned to the tank or directed away therefrom.

32. In a blackleading machine, the combination with a tank or container for holding blacklead solution, of a carrier in the tank above the solution, means for applying black lead solution to a case supported on the carrier, means for withdrawing solution from the tank, a main delivery pipe, a valve in the pipe, connections from the valve by which the solution may be returned to the tank or directed away therefrom, and a strainer in the connections from the valve to the tank.

33. In a black leading machine the combination of a case carrier, means for carrying a case on the carrier in an angular position, means for supplying black lead solution to the face of the case and means for driving the carrier.

34. In a black leading machine the combination of a case carrier, means for carrying a case on the carrier in an angular position, means for supplying black lead solution to the face of the case, means for evening and removing the solution while the case is on the carrier, and means for driving the carrier.

35. In a black leading machine, the combination of a case carrier, means for carrying a case on the carrier in an angular position, nozzles angularly arranged adjacent the carrier for supplying black lead solution to the face of the case, and means for driving the carrier.

36. In a black leading machine the combination of a rotating case carrier, means for supporting a case on the carrier, means for supplying black lead solution to the face of the case, means for supplying air under pressure to the face of the case after the black lead solution has been applied, and means for rotating the carrier past the solution supplying and air supplying means.

In testimony whereof, I have hereunto set my hand.

WILLIAM M. WOOD.